US012780438B2

(12) United States Patent
Latif

(10) Patent No.: US 12,780,438 B2
(45) Date of Patent: Nov. 3, 2026

(54) AIRCRAFT TAIL JET ANTI-STALL SYSTEM

(71) Applicant: Babar Latif, Calgary (CA)

(72) Inventor: Babar Latif, Calgary (CA)

( * ) Notice: Subject to any disclaimer, the term of this patent is extended or adjusted under 35 U.S.C. 154(b) by 45 days.

(21) Appl. No.: 18/797,684

(22) Filed: Aug. 8, 2024

(65) Prior Publication Data

US 2026/0042543 A1 Feb. 12, 2026

(51) Int. Cl.

| | |
|---|---|
| ***B64D 33/04*** | (2006.01) |
| ***B64C 15/02*** | (2006.01) |
| ***B64D 31/04*** | (2006.01) |
| *B64C 27/82* | (2006.01) |
| *B64D 41/00* | (2006.01) |

(52) U.S. Cl.

CPC .............. *B64D 33/04* (2013.01); *B64C 15/02* (2013.01); *B64D 31/04* (2013.01); *B64C 27/82* (2013.01); *B64C 2027/8245* (2013.01); *B64D 2041/002* (2013.01)

(58) Field of Classification Search

CPC .. B64D 33/04; B64C 15/02; B64C 2027/8245
See application file for complete search history.

(56) References Cited

U.S. PATENT DOCUMENTS

| | | | | |
|---|---|---|---|---|
| 5,934,608 A * | 8/1999 | Dockter | B64C 27/82 | 244/17.19 |
| 6,568,635 B2 * | 5/2003 | Carpenter | B64C 15/02 | 244/82 |
| 6,918,244 B2 * | 7/2005 | Dickau | F02K 3/025 | 60/229 |
| 8,636,242 B2 * | 1/2014 | Smith | B64C 27/82 | 244/17.19 |
| 11,772,809 B2 * | 10/2023 | Stangl | B64C 15/02 | 239/265.33 |

* cited by examiner

*Primary Examiner* — Brian M O'Hara

(74) *Attorney, Agent, or Firm* — Lewellyn Law, PLLC; Stephen Lewellyn

(57) ABSTRACT

An aircraft tail jet anti-stall system may have an engine capable of producing thrust to an aircraft, the engine located in an aircraft tail. The system may have a diverter connected to the engine to receive exhaust thrust from the engine, the diverter configured to direct the exhaust thrust received from the engine in one of three different directions, the first direction being upwardly relative to the aircraft tail to provide a nose-up thrust to the aircraft for a nose-pitch up maneuver, the second direction being rearward relative to the aircraft tail, and the third direction being downward relative to the aircraft tail to provide a nose-down thrust to the aircraft for a nose pitch-down maneuver.

18 Claims, 8 Drawing Sheets

AIRCRAFT TAIL JET ANTI-STALL SYSTEM

FIELD OF THE INVENTION

The invention relates generally to aircraft pitch control and, more particularly, to systems for providing auxiliary pitch control to an aircraft to recover from a stall and/or false stall condition.

BACKGROUND OF THE INVENTION

An aircraft stall occurs when the angle of attack increases beyond a critical point at which the airflow can no longer smoothly adhere to the wing's upper surface. This results in a sudden loss of lift and an increase in drag, causing the aircraft to lose altitude. Sometimes, the stalling is recoverable, but sometimes, it is not. In certain instances, an aircraft may lose pitch control authority using regular flight controls, and the aircraft is in imminent danger of stalling. In such cases, there is little a pilot can do to recover from the stall. Accordingly, there is a need and a desire for a system that enables a pilot with auxiliary pitch control to recover from or prevent an aircraft stall.

SUMMARY OF THE INVENTION

In-flight situations may arise where an aircraft has lost pitch control authority using regular flight controls, and the aircraft is in imminent danger of stalling. In such critical scenarios, the system described herein, designed to provide auxiliary pitch control maneuvering authority, can be a life-saving tool for the pilot.

The system described herein can provide authority to control the pitch in either an upward or downward direction when, in a given situation during the flight, the pitch control in the desired direction is lost or is difficult to exercise using conventional pitch control authorities.

The system described herein uses a turbo-jet engine, capable of producing thrust as well as producing auxiliary power, that is installed either in place of a conventional auxiliary power unit (APU) in new aircraft designs or can also be retrofitted to the in-service aircraft by replacing the existing APU.

In some aspects, an aircraft tail jet anti-stall system may have an engine capable of producing thrust, the engine located in an aircraft tail; and a diverter connected to the engine to receive exhaust thrust from the engine, the diverter configured to direct the exhaust trust received from the engine in one of three different directions, a first direction being upwardly relative to the aircraft tail to provide a nose-up thrust to the aircraft for a pitch up maneuver, a second direction being rearward relative to the aircraft tail where the thrust is not necessarily required, and a third direction being downward relative to the aircraft tail to provide a nose-down thrust for a pitch down maneuver to the aircraft.

In some aspects, the turbojet engine may be configured to be operated in one of two different states, the first state wherein the engine is operated as an auxiliary power unit (APU) and the exhaust thrust is directed by the diverter in the second direction, and the second state wherein the engine is operated to provide thrust to the aircraft and the exhaust thrust is directed by the diverter in either the first or third direction.

In some aspects, the aircraft tail jet anti-stall system may have an electric generator, a load compressor, and a gearbox, the gearbox operatively connecting the electrical generator and load compressor to the turbojet engine to be driven by the engine.

In some aspects, the diverter may have a pair of deflectors. In some aspects, the deflectors may have three position states, a first position state wherein the deflectors are positioned such that exhaust thrust is directed in the second direction, a second position state wherein the deflectors are positioned such that exhaust thrust is directed in the first direction, and a third position state wherein the deflectors are positioned such that exhaust thrust is directed in the third direction.

In some aspects, the aircraft tail jet anti-stall system may have a first actuator operably connected to a first deflector and operable to position the deflector between the three position states; and a second actuator operably connected to a second deflector and operable to position the deflector between the three position states.

In some aspects, each deflector can be positioned as either open or closed by the actuator to which it is operatively connected. Three exhaust directions can be achieved by the combination of these positions of both deflectors. Both deflectors can be positioned as closed at the same time but cannot be positioned as open at the same time.

When both deflectors are in the closed position, the exhaust thrust is directed by the diverter in the second position. In this position, the turbojet engine is configured to generate electrical power like a conventional APU. When the first deflector is positioned as open and the second is positioned as closed, the exhaust thrust is directed by the diverter in the first direction. In this position, the electrical generator is disconnected from the engine, and the entire engine power is used to produce jet thrust. When the first deflector is positioned closed and the second is positioned open, the exhaust thrust is directed by the diverter in the third direction. In this position, the electrical generator is disconnected from the engine, and the entire engine power is used to produce jet thrust.

In some aspects, the aircraft tail jet anti-stall system may have a computer, and a lever manually operable by a pilot. The computer may be operatively connected to the first and second actuators and the lever and operates to control the first and second actuators to position the first and second deflectors, respectively, in one of the three position states based on a position of the lever.

In some aspects, the lever may have a neutral position, an up position, and a down position, wherein when the lever is in the neutral position, the first and second deflectors are positioned in the first position state, wherein when the lever is in the up position, the first and second deflectors are positioned in the second position state, and wherein when the lever is in the down position, the first and second deflectors are positioned in the third position state.

Numerous additional objects, features, and advantages of the present invention will be readily apparent to those of ordinary skill in the art upon a reading of the following detailed description of presently preferred but illustrative embodiments of the present invention when taken in conjunction with the accompanying drawings. The invention is not limited to a single application but is capable of various embodiments and of being practiced and carried out in numerous ways. Also, it is to be understood that the phraseology and terminology employed herein are for descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

For a better understanding of the invention, its operating advantages, and the specific objects attained by its uses, reference should be made to the accompanying drawings and descriptive matter in which there are illustrated embodiments of the invention.

BRIEF DESCRIPTION OF THE DRAWINGS

The following drawings illustrate by way of example and are included to provide a further understanding of the invention for illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature or a feature with similar functionality. In the drawings.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized, and changes can be made without departing from the scope of the disclosure.

Figure 1:
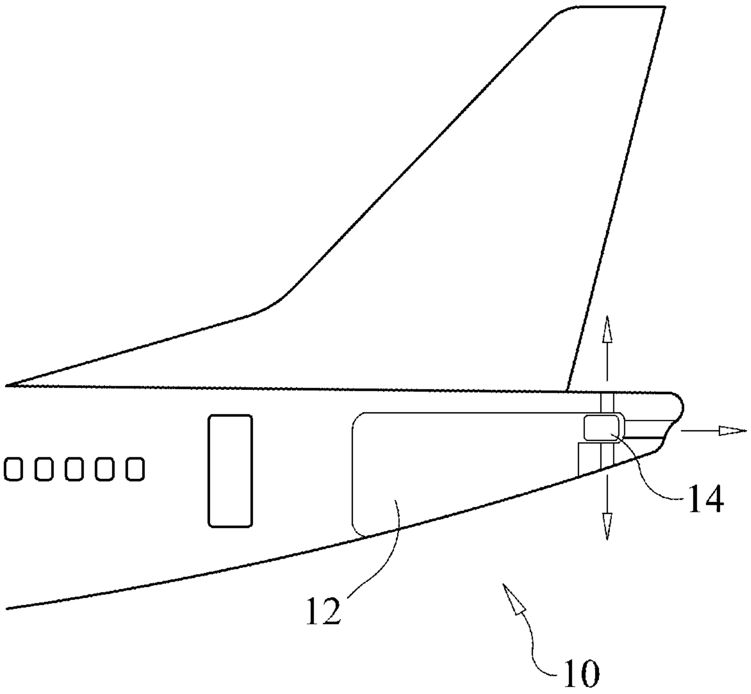
FIG. 1 is a block diagram schematically representing a tail portion of an aircraft, such as, for example, a commercial airliner, having an aircraft tail jet anti-stall (TJAS) system, according to an aspect of the invention.

FIG. 1 is a block diagram schematically representing a tail portion of an aircraft, such as, for example, a commercial airliner, having an aircraft tail jet anti-stall (TJAS) system 10, according to an aspect of the invention. As representatively shown, system 10 is in place of a conventional auxiliary power unit (APU) of the aircraft. Generally, an APU is a small gas turbine engine located in the aircraft's tail. Its primary purpose is to provide energy for various functions when the aircraft's main engines are not running. For example, the APU generates compressed air to start main engines, and electrical power to operate the aircraft's electrical systems while on the ground, such as lighting, avionics, entertainment systems, and air conditioning (i.e., auxiliaries). The exhaust of the APU is vented to the atmosphere through the aircraft's tail cone. This vent exhaust from the APU is not required to provide jet thrust for the aircraft.

System 10 has a turbine engine 12 that can operate like a conventional APU to provide auxiliaries or can be operated so that its exhaust provides jet thrust for the aircraft. In essence, turbine engine 12 can be operated like a conventional APU, but when in flight, the turbine engine can be operated as a jet engine to provide thrust to the aircraft. In aspects, turbine engine 12 may be configured to operate either as an APU or a jet engine, but not both operations simultaneously.

As further depicted, system 10 has a three-way exhaust diverter 14 configured to direct the exhaust of the turbine engine 12 to one of three selectable exits. That is, diverter 14 is configured to direct the engine exhaust rearwardly through the tail, upwardly to provide a pitch-up thrust to the aircraft, or downwardly to provide a pitch-down thrust to the aircraft, as will be explained in more detail herein.

Figure 2:
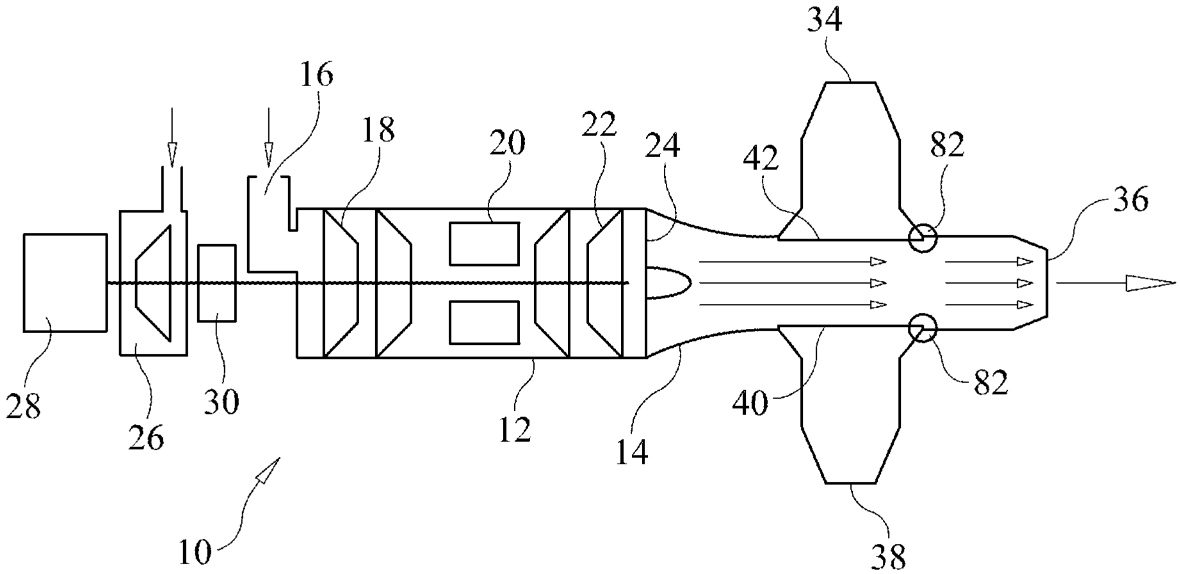
FIG. 2 is a block diagram schematically representing the TJAS system according to an aspect of the invention, showing the system in a normal APU operating configuration.

FIG. 2 is a block diagram schematically representing system 10 according to an aspect of the invention. System 10 includes turbine engine 12 and exhaust diverter 14. Turbine engine 12 may be a conventional turbine engine with an air inlet 16, air compressor section 18, combustor section 20, turbine section 22, and exhaust outlet 24. Further, turbine engine 12 may have a load compressor 26, an electric generator 28, and a gearbox 30 configured to connect and disconnect the load compressor and the electrical generator to the turbine drive shaft.

Exhaust diverter 14 may be a plenum having an inlet 32 that is connected to the exhaust outlet 24 of turbine engine 12 to receive exhaust gas from the engine, which is then directed to one of three exits 34, 36, and 38 by deflectors 40 and 42. Exit 34 is located to direct exhaust from the engine upwardly, exit 36 is located to direct exhaust from the engine rearwardly (as in a conventional APU exhaust), and exit 38 is located to direct exhaust from the engine downwardly. Exits 34 and 38 have jet nozzles (not shown) to generate thrust. A selector lever (not shown here) is provided to the pilot to select which outlet the exhaust from the engine is directed through by the deflectors 40 and 42.

As representatively shown here, system 10 is in an auxiliaries configuration, where it is configured to provide auxiliaries to the aircraft (i.e., not provide any jet thrust to the aircraft). The auxiliaries configuration is typically used when the aircraft is on the ground, and in this configuration, the operation is like that of a conventional APU. System 10 may be placed in this configuration with the selector lever in a neutral position, which places the deflectors 40 and 42 such that engine exhaust is directed through exit 36 by closing off exits 34 and 38, as depicted. Further, in this configuration, gearbox 30 operably connects the electric generator and load compressor to the engine's drive shaft so that the engine drives the generator and load compressor.

Figure 3:
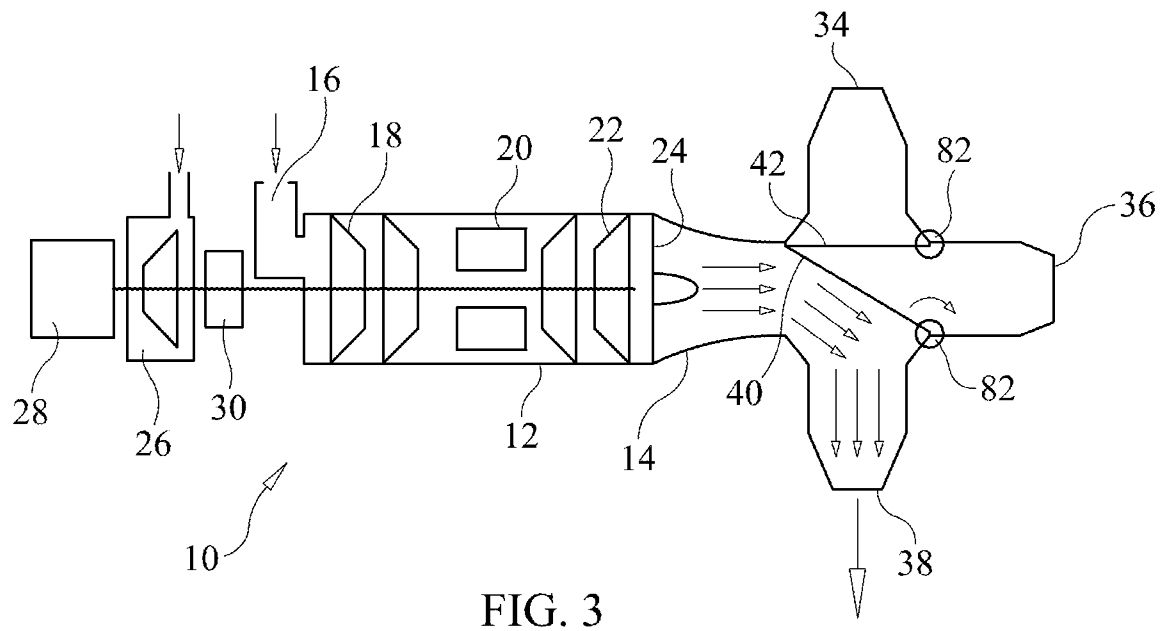
FIG. 3 is a block diagram schematically representing the TJAS system according to an aspect of the invention, showing the system in a nose-down operating configuration.

FIG. 3 is a block diagram schematically representing system 10 according to an aspect of the invention. As shown here, system 10 is in a downward thrust configuration. During the flight, if the nose of the aircraft pitches upward due to stall and the nose cannot be pitched down for level flight by using the conventional control authorities, then the pilot can select the lever position for nose pitch-down configuration. By selecting this configuration, the load compressor and the generator are disengaged from the main shaft, the throttle is increased and the entire engine power is available to generate jet thrust. In this nose-down configuration, the deflector 40 is rotated by an actuator to block the passage to exit 36 at the tail cone, and the jet stream is deflected downward through exit 38. In this configuration, the downward jet thrust pushes the tail up and pitches the aircraft nose down to recover from an unwanted stall.

Figure 4:
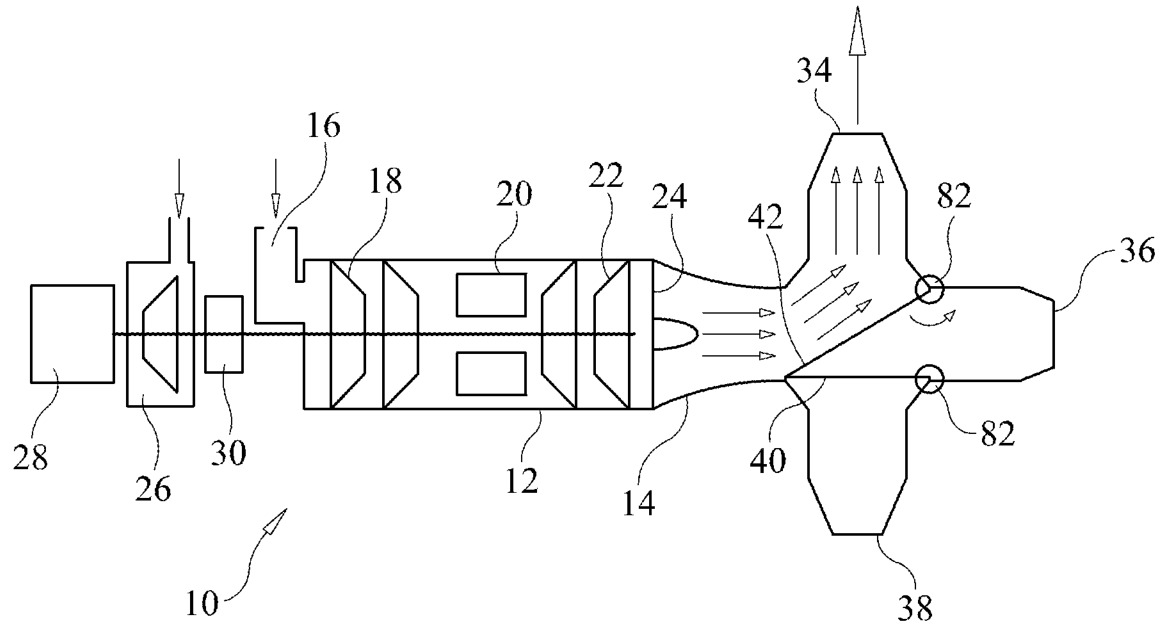
FIG. 4 is a block diagram schematically representing the TJAS system according to an aspect of the invention, showing the system in a nose-up operating configuration.

FIG. 4 is a block diagram schematically representing system 10 according to an aspect of the invention. As shown here, system 10 is in an upward thrust configuration. During the flight, if the nose of the aircraft pitches downward due to any reason like a false stall, due to a system error that assumes a stall condition and forces the nose to pitch down, and the nose cannot be pitched up for level flight by using the conventional control authorities, then the pilot can select the lever position for nose pitch-up configuration. By selecting this configuration, the load compressor and the generator are disengaged from the main shaft, the throttle is increased and the entire engine power is available to generate jet thrust. In this nose-up configuration, the deflector 42 is rotated by an actuator to block the passage to exit 36 at the tail cone, and the jet stream is deflected upward through exit 34. In this configuration, the upward jet thrust pushes the tail down and pitches the aircraft nose up to recover from an unwanted nosedive.

Figure 5:
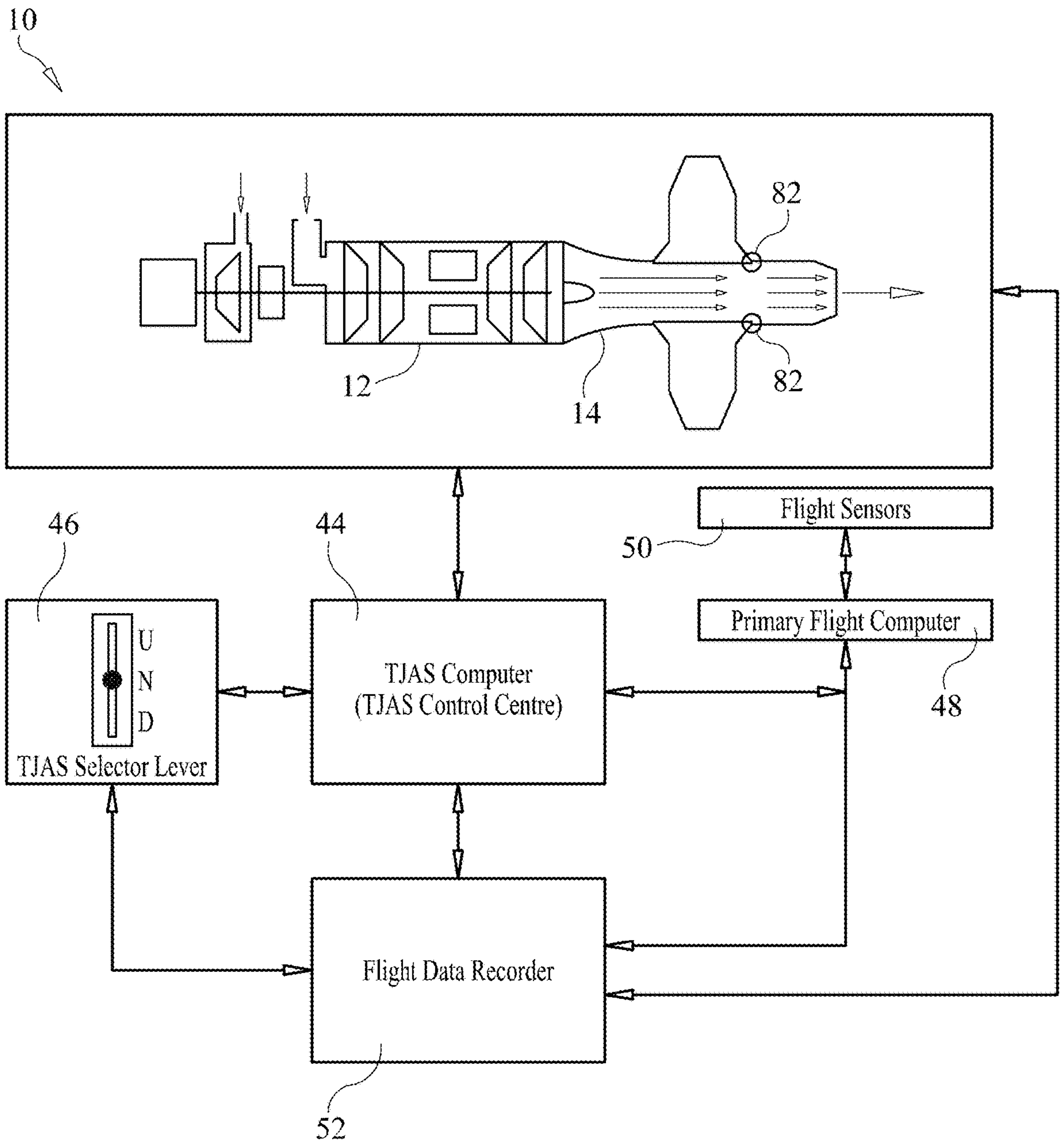
FIG. 5 is a block diagram schematically representing the TJAS system and its interface with the aircraft systems according to an aspect of the invention.

FIG. 5 is a block diagram schematically representing system 10 according to an aspect of the invention. As shown here, system 10 may further include a computer 44 and selector lever 46. As further shown, engine 12, actuators 84, and selector lever 46 are each operably connected to computer 44 to send and receive data therebetween. Similarly, engine 12, actuators 84, selector lever 46, and computer 44 each may be operably connected to the aircraft's flight computer 48, flight sensors 50 (i.e., level and/or stall sensors), and/or flight data recorder 52 to send and receive data therebetween. For the purpose herein, a computer could include more than one computer. For the purpose herein, data can include any information related to the flight and control of the aircraft, including control of the system 10.

In some aspects, system 10 may be managed by computer 44, which may operate to execute all related command inputs from the pilot for operating system 10. Computer 44 may ensure that system 10 is ready to deliver the desired output in a particular situation. In aspects, computer 44 may evaluate the suitability of commands received by the pilot for safe execution by comparing them with the current flight parameters in a programmed list to validate maneuvers.

In some aspects, system 10 may be designed to be activated during several events. The system may be activated when the normal authority to pitch the nose down is unavailable in a true stall condition due to a loss of speed and aerodynamic forces. The system may be activated when a computer system of the aircraft due to some error assumes a stall condition and forces the nose to pitch down by trimming the horizontal stabilizers and the normal control authority cannot correct this condition to pitch the nose up. The system may be activated to restore a level flight when a horizontal stabilizer runaway condition occurs in any direction.

System 10 may be configured to be manually operated by the pilot. In aspects, the pilot, when notified or altered by flight status indicators for a stall condition in which the pilot wants to move the nose down or if the pilot realizes a false stall condition in which the pilot wants to move the nose up, the pilot may arm the system by pressing an arm button that makes the system enabled and ready to be used, and move the lever for the desired maneuver of either nose down or nose up. The pilot continues to hold the lever in position as long as deemed required or until the desired maneuver is completed. The lever stays in position by manually holding it in the position. As soon as the pilot releases the lever, it returns to its normal position.

Computer 44 operates to activate or control the actuator associated with the deflector required to effectuate the desired configuration of the system based on the lever position. The computer may also operate to disengage the electric generator and the load compressor and set the thrust level by increasing the throttle of the turbine engine to the maximum. When the deflector being moved reaches its maximum rotational position, the computer receives a signal from a position sensor or switch that may be installed on the actuator shaft, and the computer operates to stop the actuator. The pilot continues to hold the lever in position as long as deemed required or until the desired maneuver is completed, nose-down or nose-up. The lever stays in position by manually holding it in the position. As soon as the pilot releases the lever, it returns to the normal position, and the computer activates the corresponding actuator to move the corresponding deflector back to the closed or normal position. When the deflector reaches its normal or closed position, the computer receives a signal from a related position sensor or switch, and the computer deactivates the actuator. To execute a maneuver, the pilot must again arm the system and move and hold the lever in position. After arming the system, the pilot can also disarm it, by pressing a disarm button, without moving the lever if the desired maneuver is not required. Disarming disables the system 10 to prevent any nose pitch maneuver execution by accident.

In some aspects, when a pilot determines that a nose pitch-up maneuver is required using system 10, the pilot will arm the system. The pilot then moves the lever up and holds it in position. Computer 44, upon sensing activation of the system, may perform a safety check and validate the maneuver (discussed below), and if the maneuver is validated, the computer operates to activate the actuator for deflector 42, upon which the deflector is moved into position, thereby deflecting engine exhaust through exit 34. Computer 44 may then disengage the load compressor 26 and the electric generator 28 from engine 12 by operating gearbox 30. Computer 44 may increase the thrust level of engine 12 to the maximum. The engine exhaust is directed upward through exit 34, providing a downward movement to the tail of the aircraft and, as a reaction, moving the nose upward.

During the entire nose-pitch-up maneuver execution, the pilot keeps holding the lever in the up position. When the pilot determines the nose-pitch-up maneuver has been executed enough and decides to terminate the maneuver the lever is released. Computer 44 may then operate to return system 10 to the APU operating status, wherein the engine throttle is lowered back, and the load compressor and/or the electrical generator are engaged with the engine. Computer 44 may operate to activate the actuator for deflector 42 to return it to its normal position wherein the exhaust gas is directed through the diverter and out of exit 36 at the tail cone.

In some aspects, during the entire execution of the nose-pitch-up maneuver, computer 44 may operate in coordination with the flight computer 48 which may operate to supervise the maneuver. If, during the maneuver, computer 44 and/or computer 48 senses the over-pitch-up of the nose, the maneuver will automatically be terminated even if the pilot is holding the lever up in the nose-pitch-up position.

In some aspects, when a pilot determines that a nose pitch-down maneuver is required using system 10, the pilot will arm the system. The pilot then moves the lever down and holds it in position. Computer 44, upon sensing activation of the system, may perform a safety check and validate the maneuver (discussed below), and if the maneuver is validated, the computer operates to activate the actuator for deflector 40, upon which the deflector is moved into position, thereby deflecting engine exhaust through exit 38. Computer 44 may then disengage the load compressor 26 and the electric generator 28 from engine 12 by operating gearbox 30. Computer 44 may increase the thrust level of engine 12 to the maximum. The engine exhaust is directed downward through exit 38, providing an upward movement to the tail of the aircraft and, as a reaction, moving the nose downward.

During the entire nose-pitch-down maneuver execution, the pilot keeps holding the lever in the down position. When the pilot determines the nose-pitch-down maneuver has been executed enough and decides to terminate the maneuver the lever is released. Computer 44 may then operate to return system 10 to the APU operating status, wherein the engine throttle is lowered back, and the load compressor and/or the electrical generator are engaged with the engine. Computer 44 may operate to activate the actuator for deflector 40 to return it back to its normal position, wherein the exhaust gas is directed through the diverter and out of exit 36 at the tail cone.

In some aspects, during the entire execution of the nose-pitch down maneuver, computer 44 may operate in coordination with the flight computer 48 which may operate to supervise the maneuver. If, during the maneuver, computer 44 and/or computer 48 senses the over-pitch down of the nose, the maneuver will automatically be terminated even if the pilot is holding the lever down in the nose-pitch down position.

In some aspects, before system 10 operates to perform any maneuver, system 10 may run a safety check to validate the desired maneuver requested. The safety check may include computer 44 analyzing data from flight sensors, such as level sensors and stall sensors. In aspects, computer 44 may not execute a maneuver if the nose is already in the desired direction compared to the normal level of the aircraft. In some aspects, computer 44 may terminate a nose-up maneuver if the stall sensor notifies. In some aspects, computer 44 may terminate a nose-down maneuver if the aircraft nose is pitched down more than a set allowed parameter. In some aspects, computer 44 may terminate a nose-down maneuver if the aircraft speed is more than a set allowed parameter.

Figure 6:
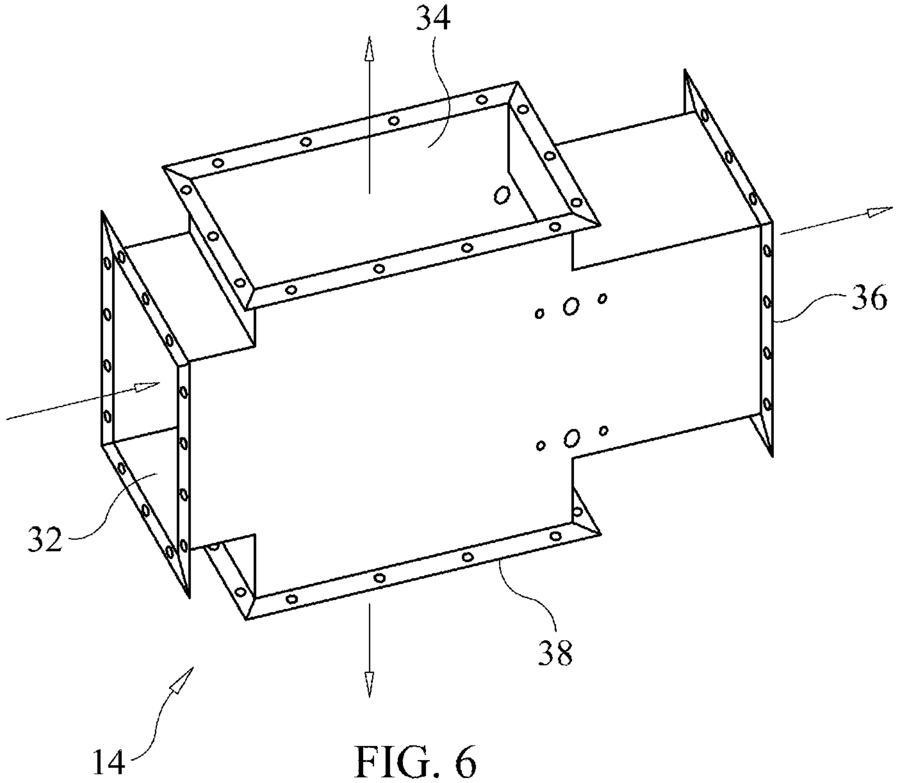
FIG. 6 is a diagrammatic illustration of a three-way exhaust diverter of the TJAS system.

In FIG. 6, an exhaust diverter 14 of system 10 is diagrammatically shown, according to an aspect of the invention. Diverter 14 has a plenum-like construction to receive exhaust from the turbine engine at its inlet 32 and direct the exhaust to one of three exits 34, 36, and 38 by deflectors (not seen here) that are located in the diverter and mounted for movement relative to the diverter to direct exhaust to one of the exits. As representatively shown, exits 34 and 38 are located on opposite top and bottom sides of the plenum, respectively, and exit 36 is located axially aligned with inlet 32 at the end opposite the inlet. While not shown, jet nozzles may be connected to the exits. When diverter 14 is in the aircraft tail, exit 34 is oriented in an upward direction, exit 38 is oriented in a downward direction relative to the aircraft tail, and exit 36 is oriented rearward to the tail cone.

Figure 7:
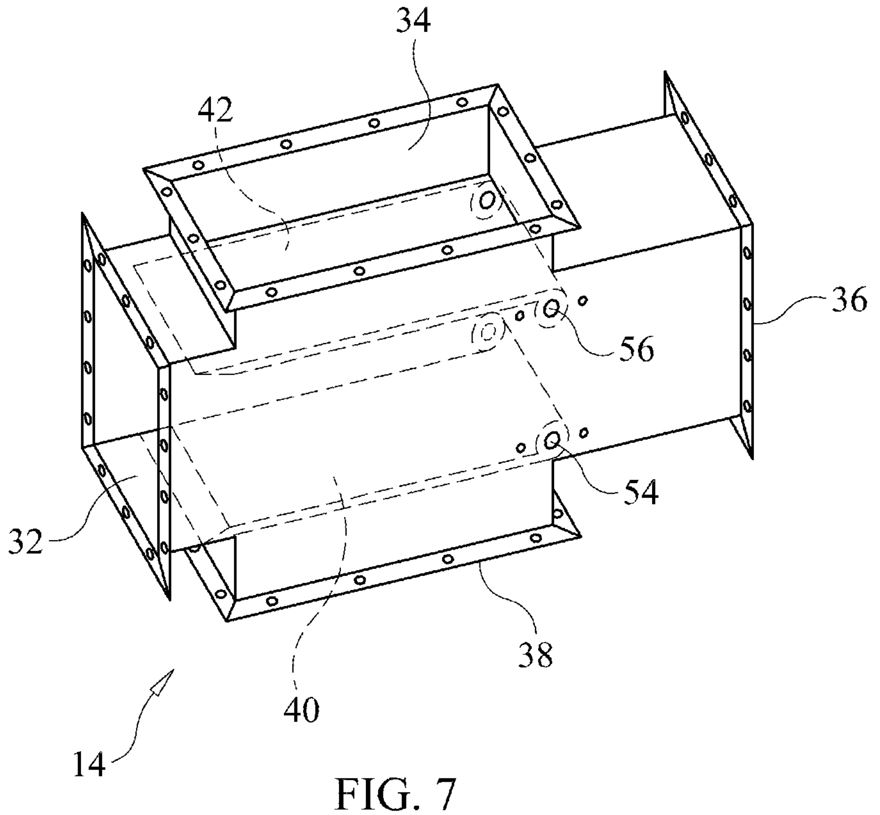
FIG. 7 is another diagrammatic illustration of a three-way exhaust diverter of the TJAS system.

In FIG. 7 diverter 14 is shown with deflectors 40 and 42, according to an aspect of the invention. Deflectors 40 and 42 are located inside the diverter and extend lengthwise between inlet 32 and exit 36 and across exits 34 and 38. Deflector 40 extends across exit 38 and is shown in the neutral or normal position, wherein it seals air passage to exit 38. Similarly, deflector 42 is shown in its neutral or normal position, wherein it seals air passage to exit 34. Deflector 40 is attached to the diverter at pivot points 54, located on opposite sides, for rotation to move its forward end (the end closest to inlet 32) upward to divert exhaust from the inlet to exit 38. Likewise, deflector 42 is attached to the diverter at pivot points 56 for rotation to move its forward end (the end closest to inlet 32) downward to divert thrust from the inlet to exit 34.

Figure 8:
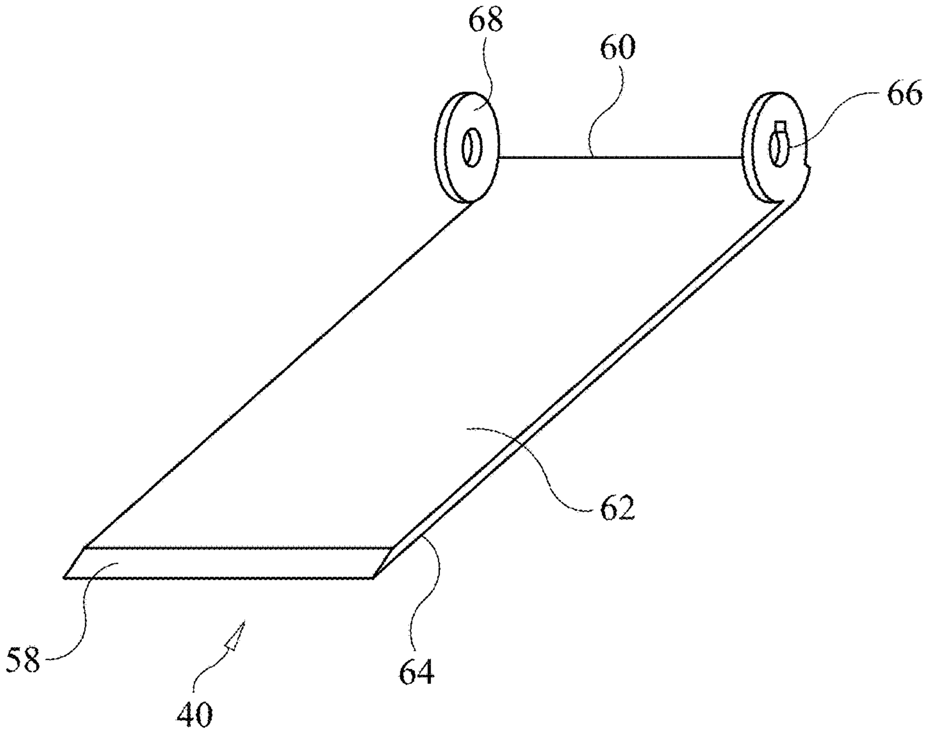
FIG. 8 is a diagrammatic illustration of a first exhaust thrust deflector of the TJAS system.

In FIG. 8, there is diagrammatically shown deflector 40, according to an aspect of the invention. Deflector 40 has a front end 58, an opposite back end 60, and opposite broad planar surfaces 62 and 64. At end 60, deflector 40 may have a pair of lugs 66 and 68, one on each side. Lugs 66 and 68 may pivotally attach the deflector to the diverter and connect the deflector to an actuator for rotation. Other structures could be used to substitute the lugs for the same purpose.

Figure 9:
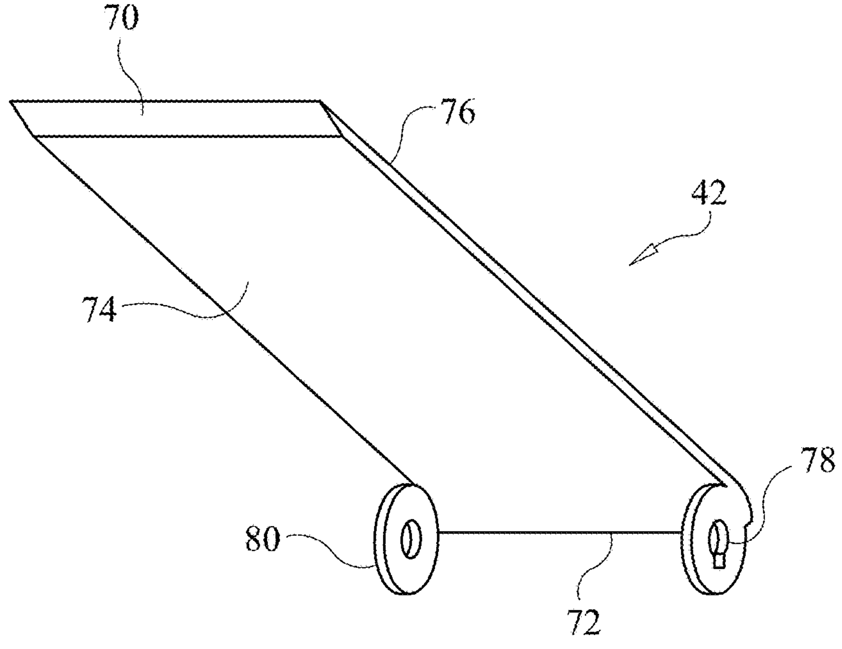
FIG. 9 is a diagrammatic illustration of a second exhaust thrust deflector of the TJAS system.

FIG. 9 is a diagrammatic perspective view of deflector 42. Deflector 42 has a front end 70, an opposite back end 72, and opposite broad planar surfaces 74 and 76. At end 72, deflector 42 may have a pair of lugs 78, 80 one on each side. Lugs 78, 80 may serve to pivotally attach the deflector to the diverter and to connect the deflector to an actuator for rotation. Other structures could be used to substitute the lugs for the same purpose.

Figure 10:
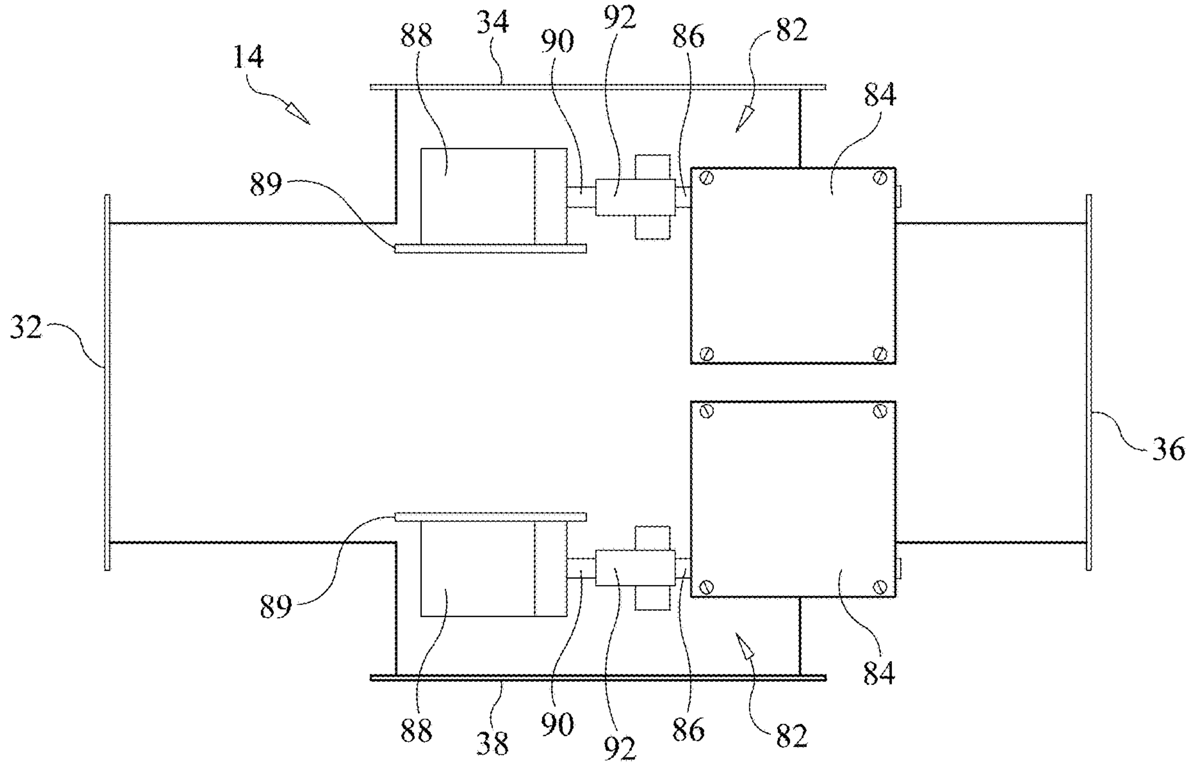
FIG. 10 is a diagrammatic side view of a diverter shown with two actuator assemblies.

FIG. 10 is a diagrammatic side view of diverter 14 with two actuator assemblies 82. Assemblies 82 are considered examples as different assemblies and/or actuators could be implemented for the same purpose of rotating the deflectors without departing from the scope of this disclosure. Accordingly, the structure forming the assemblies 82 should not be regarded as limiting unless otherwise specified. As representatively shown, assemblies 82 include a worm gearbox 84 having an input shaft 86 (its output shaft not shown here is connected to a respective deflector), a motor 88 having a motor shaft 90 that is rotatingly driven by the motor, and a shaft coupler 92. Motor 88 is supported by motor mount structure 89 which itself is not attached to the diverter 14 to prevent heat transfer from the diverter to the motor.

Figure 11:
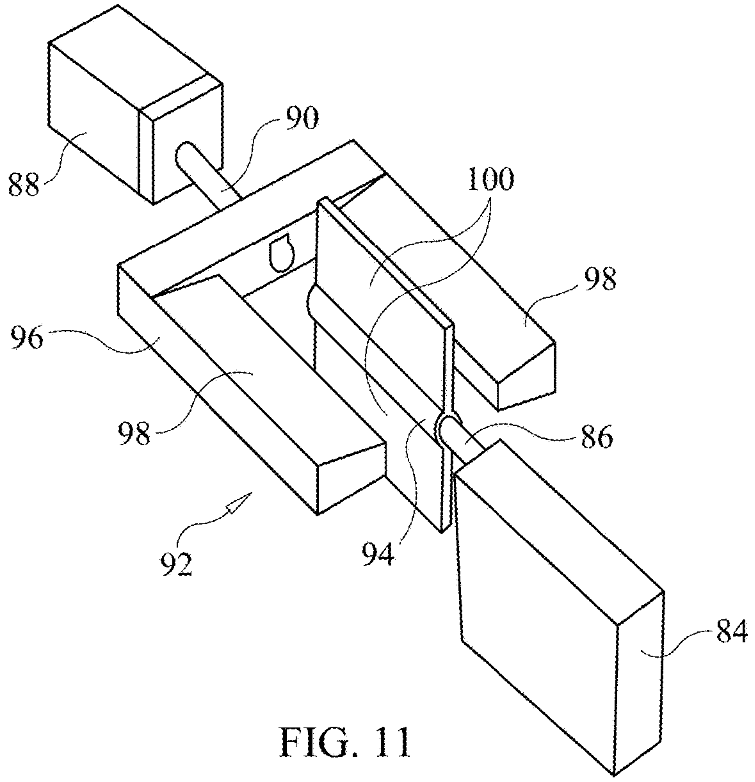
FIG. 11 is a diagrammatic perspective view showing a coupler in a decoupled position with a motor shaft and an input shaft disconnected of an actuator assembly.

FIG. 11 is a diagrammatic perspective view showing shaft coupler 92. Shaft coupler 92 is configured to connect and disconnect the motor shaft 90 and the worm gearbox input shaft 86 to selectively drive the input shaft by the motor. Shaft coupler 92 is not drawn to scale and is shown enlarged compared to the motor and worm gear box for the sake of clarity. The purpose is to minimize heat transfer to motor 88 from engine exhaust gas flowing through the diverter 14. As representatively illustrated, shaft coupler 92 has a flap member 94 and a fork member 96. Flap member 94 is attached to input shaft 86 of worm gearbox 84 for conjoined rotation therewith. Fork member 96 is attached to the motor shaft 90 for conjoined rotation therewith. Fork member 96 has a pair of spaced forks 98 and flap member 94 has pair of opposing radially extending wings 100 that are located between the forks. Rotation of the motor shaft 90, either clockwise or counterclockwise, rotates the fork member 96 causing the forks 98 to contact the wings 100 which translates rotational motive force from the motor shaft 90 to the worm gearbox input shaft 86.

Figure 12:
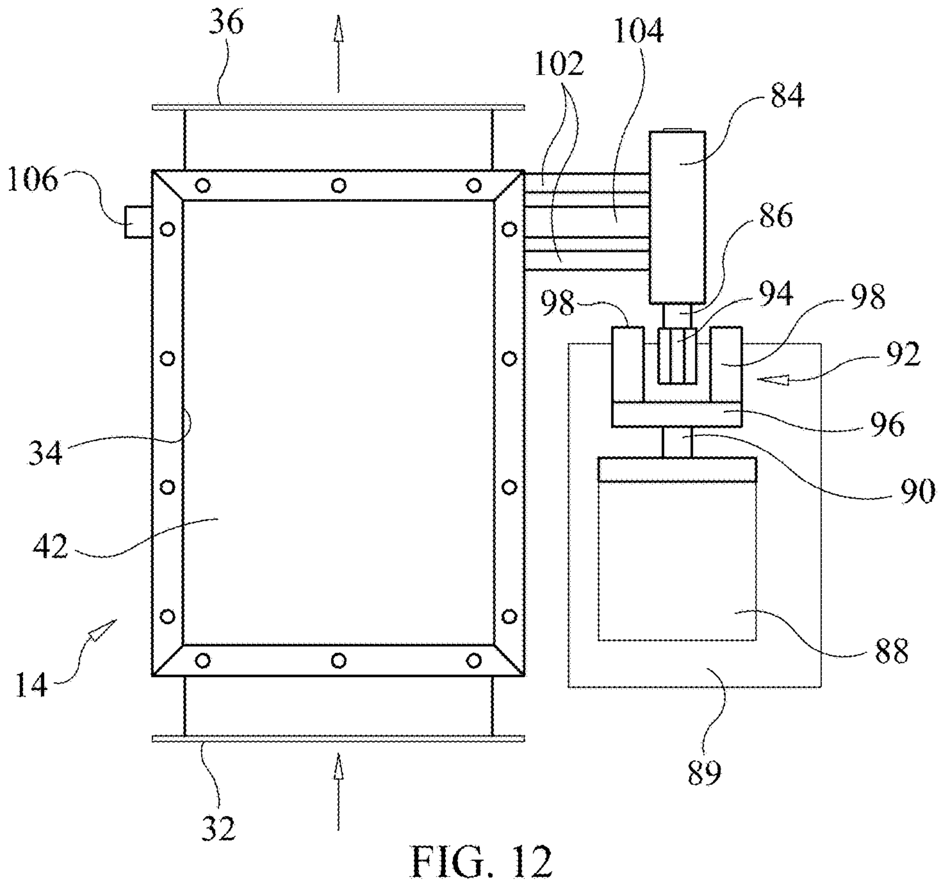
FIG. 12 is a diagrammatic top view of a diverter shown with an assembly for an up-deflector.

FIG. 12 is a diagrammatic top view of diverter 14 shown with assembly 82 for the up-deflector 42. As representatively shown, worm gearbox 84 may be rigidly connected to the side of the diverter 14 at a spaced distance by one or more spacer studs 102. Further shown is the worm gearbox output shaft 104, connected to deflector 42, and shaft 106, connected to the deflector on the opposite side of the diverter. As further described below, shafts 104 and 106 rotatably support the deflector at its lugs (not shown here) to connect the deflector to the diverter 14 pivotally. The coupler 92 is shown in the decoupled position with the motor shaft 90 and the input shaft 86 disconnected, as in FIG. 11.

Not shown is one or more position sensors that operate to determine a rotational position of each deflector. For example, a rotational position sensor could be used to determine the rotational position of shaft 106 so that the rotational position of the deflector is known or can be calculated for operating system 10.

Figure 13:
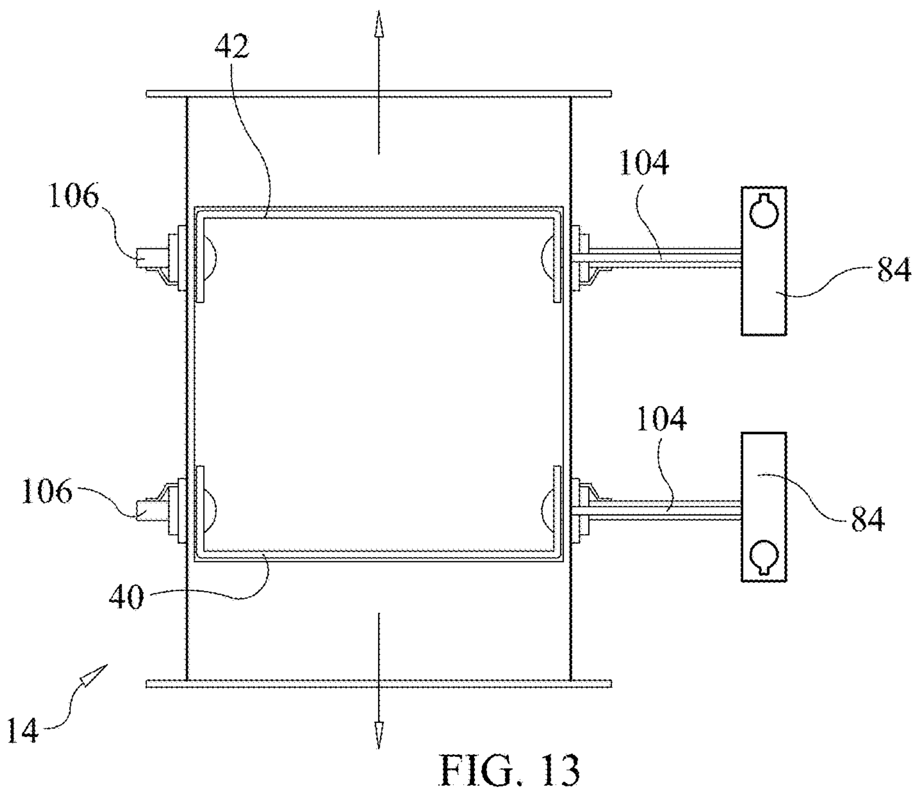
FIG. 13 is a diagrammatic cross-sectional view of a diverter viewed from a front or inlet end.
Figure 14:
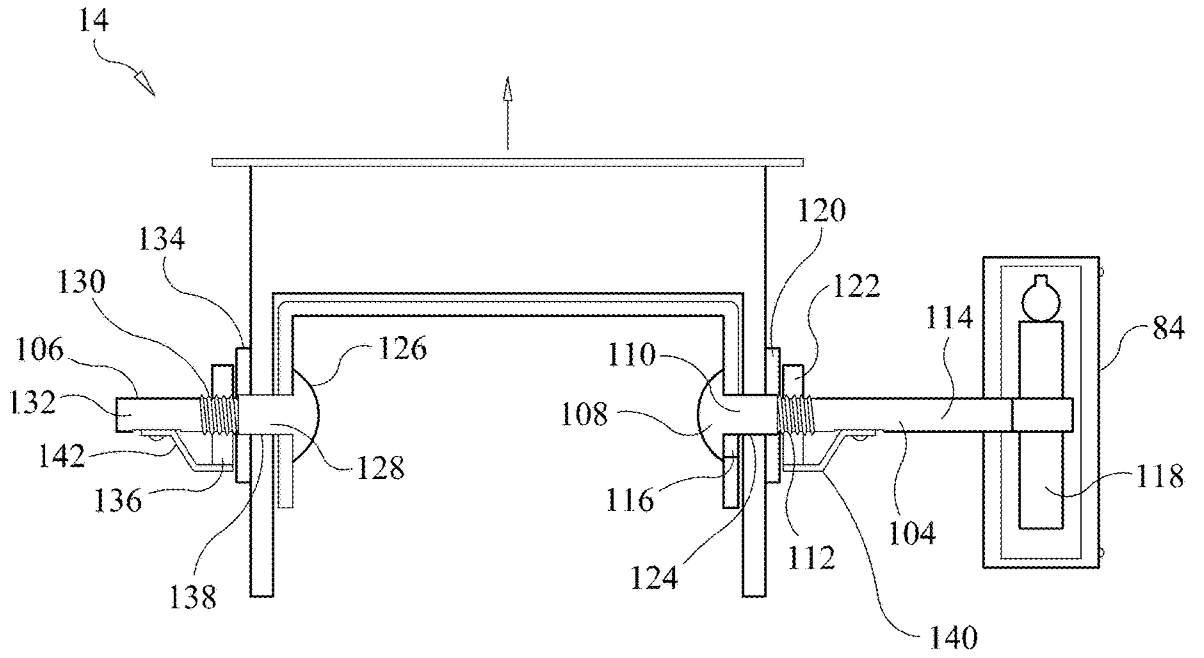
FIG. 14 is an enlarged, diagrammatic cross-sectional view of a diverter viewed from a front or inlet end.

FIG. 13 is a diagrammatic cross-sectional view of the diverter viewed from the front or inlet end 32. As seen here, deflectors 40 and 42 are each pivotally connected to diverter 14 at their respective lugs by respective shafts 104 and 106. With further reference to FIG. 14, shaft 104 connects deflector 42 to the worm gearbox 84 so that the rotational output drive from the worm gearbox 84 is translated to the deflector to rotate the deflector about shafts 104 and 106 to affect thrust diversion in the diverter as described above.

Shaft 104 may have a head 108 at one end, a first shank portion 110, a threaded portion 112, and a second shank portion 114 that terminates at an end opposite the head. The first shank portion 110 may have key 116 that is received by a notch formed in the respective lug through which the shaft extends. The end of the second shank portion 114 is connected to worm wheel 118 of the worm gearbox 84 for conjoined rotation. The end may have flats formed therein for keying with the worm wheel. A washer 120 may be located between the side of the diverter 14 and a nut 122 threaded to the threaded portion 112 for securing the shaft to the diverter. Nut 122 may be secured in place by a locking device 140. The shaft is rotatable in passage 124 extending through the side of the diverter.

Shaft 106 may have a head 126 at one end, a first shank portion 128, a threaded portion 130, and a second shank portion 132 that terminates at an end opposite the head. A washer 134 may be located between the side of diverter 14 and a nut 136 threaded to the threaded portion 130 for securing the shaft to the diverter. Nut 136 may be secured in place by a locking device 142. The shaft is rotatable in passage 138 extending through the side of the diverter.

In relation to the above-described actuator assemblies 82, in a pitch-down maneuver, system 10 operates motor 88 of the actuator assembly 82 that is operatively connected to deflector 40, to turn motor shaft 90 clockwise so that the forks 98 are rotated into contact with flaps 100 of coupler 92 to engage the motor shaft and the worm gearbox input shaft 86. With the motor shaft and the worm gearbox input shaft engaged, the worm gearbox 84 is driven which in turn rotates deflector 40 from the closed position into the open position. When deflector 40 reaches its maximum open position, as determined by an associated rotation position sensor, motor 88 is stopped and reversed to rotate the forks 98 90-degrees to physically separate the forks from the flaps 100, thereby disengaging the motor shaft 90 and the worm gearbox input shaft 86 and preventing heat transfer to the motor.

When the pitch down maneuver is completed, system 10 operators motor 88 of the actuator assembly 82 that is operatively connected to deflector 40, to turn motor shaft 90 counterclockwise so that the forks 98 once again contact flaps 100 of coupler 92 to engage the motor shaft and the worm gearbox input shaft 86. With the motor shaft and the worm gearbox input shaft engaged, the worm gearbox 84 is driven which in turn rotates deflector 40 from the open position into the closed position. When deflector 40 reaches its maximum closed position, as determined by an associated rotation position sensor, motor 88 is stopped and reversed to rotate the forks 98 90-degrees to physically separate the forks from the flaps 100, thereby disengaging the motor shaft 90 and the worm gearbox input shaft 86 and preventing heat transfer to the motor. In a pitch-up maneuver, the actuator assembly 82 for deflector 42 is operated in the same manner as described above.

It will be appreciated by persons skilled in the art that the present embodiment is not limited to what has been particularly shown and described hereinabove. A variety of modifications and variations are possible in light of the above teachings without departing from the scope of the disclosure.

What is claimed is:

1. An aircraft tail jet anti-stall system, comprising:

an engine disposed in a fuselage of a fixed wing aircraft and capable of producing thrust to the aircraft;

a diverter disposed in the fuselage at a tail end of the fuselage, the diverter having an exhaust gas inlet at one end, a first exhaust exit at a top side, a second exhaust exit at a bottom side opposite of the first exhaust exit, and a third exhaust gas exit at a second end opposite of the exhaust gas inlet, the diverter connected to the engine to receive a flow of exhaust gas from the engine through the exhaust gas inlet, the diverter configured to direct the exhaust gas flow received from the engine through one of the first exhaust gas exit and the second exhaust gas exit and seal the flow of exhaust gas through the opposite of the first or second exhaust gas exit and the third exhaust gas exit, to provide either a nose-up thrust to the aircraft or a nose-down thrust to the aircraft.

2. The aircraft tail jet anti-stall system of claim 1, wherein the engine is configured to be operated in one of two different states, the first state wherein the engine is operated as an auxiliary power unit and the exhaust gas is directed by the diverter through the third exhaust gas exit, and the second state wherein the engine is operated to provide thrust to the aircraft and the flow of exhaust gas is directed by the diverter in through either the first exhaust gas exit or the second exhaust exit.

3. The aircraft tail jet anti-stall system of claim 2, further comprising:

an electric generator;

a load compressor;

a gearbox, the gearbox operatively connecting the electrical generator and load compressor to the engine to be driven by the engine.

4. The aircraft tail jet anti-stall system of claim 1, wherein the diverter includes a pair of thrust deflectors, and wherein the thrust deflectors are configured to have three position states, a first position state wherein the thrust deflectors are positioned to seal the second and third exhaust gas exits and direct the flow of exhaust gas entirely through the first exhaust gas exit providing a nose-up thrust to the aircraft, a second position state wherein the thrust deflectors are position to seal the first and third exhaust gas exits and direct the flow of exhaust gas entirely through the second exhaust gas exit providing a nose-down thrust to the aircraft, and a third position state wherein the thrust deflectors are positioned to seal the first and second exhaust gas exits and direct the flow of exhaust gas entirely through the third exhaust gas exit.

5. The aircraft tail jet anti-stall system of claim 4, further comprising:

a first actuator operably connected to a first deflector of the pair of thrust deflectors and operable to position the deflector between the three position states; and a second actuator operably connected to a second deflector of the pair of thrust deflectors and operable to position the deflector between the three position states.

6. The aircraft tail jet anti-stall system of claim 5, further comprising:

a computer;

a lever manually operable by a pilot; and wherein the computer is operatively connected to the first and second actuators and the lever and operates to control the first and second actuators to position the first and second deflectors, respectively, in one of the three position states based at least in part on a position of the lever.

7. The aircraft tail jet anti-stall system of claim 6, wherein the lever has a neutral position, an up position, and a down position, wherein when the lever is in the neutral position, the first and second deflectors are positioned in the third position state, wherein when the lever is in the up position, the first and second deflectors are positioned in the first position state, and wherein when the lever is in the down position, the first and second deflectors are positioned in the second position state.

8. In combination a fixed wing aircraft and an aircraft tail jet anti-stall system, the combination comprising:

an engine disposed in a fuselage of the aircraft and capable of producing thrust to the aircraft;

a diverter disposed in the fuselage at a tail end of the fuselage, the diverter having an exhaust gas inlet at one end, a first exhaust exit at a top side, a second exhaust exit at a bottom side opposite of the first exhaust exit, and a third exhaust gas exit at a second end opposite of the exhaust gas inlet;

the first exhaust exit configured direct exhaust gas through a top of the fuselage, the second exit configured to direct exhaust gas through a bottom of the fuselage, and the third exit configured direct exhaust gas through an end of the tail of the fuselage;

the diverter connected to the engine to receive a flow of exhaust gas from the engine through the exhaust gas inlet, the diverter configured to direct the exhaust gas received from the engine through one of the first exhaust gas exit or the second exhaust gas exit and seal the flow of exhaust gas through the opposite of the first or second exhaust gas exits and the third exhaust gas exit, to provide either a nose-up thrust to the aircraft or a nose-down thrust to the aircraft; and wherein the engine is configured to be operated in one of two different states, the first state wherein the engine is operated as an auxiliary power unit and the exhaust gas is directed by the diverter through the third exhaust gas exit, and the second state wherein the engine is operated to provide thrust to the aircraft and the flow of exhaust gas is directed by the diverter through either the first exhaust gas exit or the second exhaust exit.

9. The combination of claim 8, further comprising:

an electric generator;

a load compressor;

a gearbox, the gearbox operatively connecting the electrical generator and load compressor to the engine to be driven by the engine.

10. The combination of claim 9, wherein the diverter includes a pair of thrust deflectors, and wherein the thrust deflectors are configured to have three position states, a first position state wherein the thrust deflectors are positioned to seal the second and third exhaust gas exits and direct the flow of exhaust gas entirely through the first exhaust gas exit providing a nose-up thrust to the aircraft, a second position state wherein the thrust deflectors are position to seal the first and third exhaust gas exits and direct the flow of exhaust gas entirely through the second exhaust gas exit providing a nose-down thrust to the aircraft, and a third position state wherein the thrust deflectors are positioned to seal the first and second exhaust gas exits and direct the flow of exhaust gas entirely through the third exhaust gas exit.

11. The combination of claim 10, further comprising:

a first actuator operably connected to a first deflector of the pair of thrust deflectors and operable to position the deflector between the three position states;

a second actuator operably connected to a second deflector of the pair of thrust deflectors and operable to position the deflector between the three position states;

a computer;

a lever manually operable by a pilot; and wherein the computer is operatively connected to the first and second actuators and the lever and operates to control the first and second actuators to position the first and second deflectors, respectively, in one of the three position states based at least in part on a position of the lever.

12. The aircraft tail jet anti-stall system of claim 5, wherein the first and second actuators each have a motor having a motor shaft that is rotatably driven, a gear box having an input shaft and an output shaft, a shaft coupler operatively connected to the motor shaft and the input shaft, the output shaft operable coupled to a respective exhaust gas diverter, the shaft coupler having a fork member connected to either one of the motor shaft or the input shaft and a blade member connected to the opposite of the motor shaft or the input shaft, the blade member disposed between spaced tines of the fork member.

13. The aircraft tail jet anti-stall system of claim 4, wherein the pair of deflectors are positioned such that one deflector seals the second exhaust gas exit and a second deflector seals the third exhaust gas outlet when in the first position state.

14. The aircraft tail jet anti-stall system of claim 4, wherein the pair of deflectors are positioned such that first deflector seals the first exhaust gas exit and a second deflector seals the third exhaust gas outlet when in the second position state.

15. The aircraft tail jet anti-stall system of claim 4, wherein the pair of deflectors are positioned such that first deflector seals the first exhaust gas exit and a second deflector seals the second exhaust gas outlet when in the third position state.

16. The aircraft tail jet anti-stall system of claim 4, wherein the pair of deflectors are positioned such that a first deflector seals the third exhaust gas exit and a second deflector seals the second exhaust gas outlet when in the deflectors are in first position state, wherein the first and second deflectors are positioned such that first deflector seals the first exhaust gas exit and the second deflector seals the third exhaust gas outlet when the deflectors are in the second position state, and wherein the first and second deflectors are positioned such that the first deflector seals the first exhaust gas exit and the second deflector seals the second exhaust gas outlet when in the third position state.

17. The aircraft tail jet anti-stall system of claim 11, wherein the first and second actuators each have a motor having a motor shaft that is rotatably driven, a gear box having an input shaft and an output shaft, a shaft coupler operatively connected to the motor shaft and the input shaft, the output shaft operable coupled to a respective exhaust gas diverter, the shaft coupler having a fork member connected to either one of the motor shaft or the input shaft and a blade member connected to the opposite of the motor shaft or the input shaft, the blade member disposed between spaced tines of the fork member.

18. The aircraft tail jet anti-stall system of claim 10, wherein the pair of deflectors are positioned such that a first deflector seals the third exhaust gas exit and a second deflector seals the second exhaust gas outlet when in the deflectors are in first position state, wherein the first and second deflectors are positioned such that first deflector seals the first exhaust gas exit and the second deflector seals the third exhaust gas outlet when the deflectors are in the second position state, and wherein the first and second deflectors are positioned such that the first deflector seals the first exhaust gas exit and the second deflector seals the second exhaust gas outlet when in the third position state.

* * * * *